June 17, 1958     O. HARKE     2,839,085
MIXING VALVE
Filed Aug. 15, 1955     3 Sheets—Sheet 1
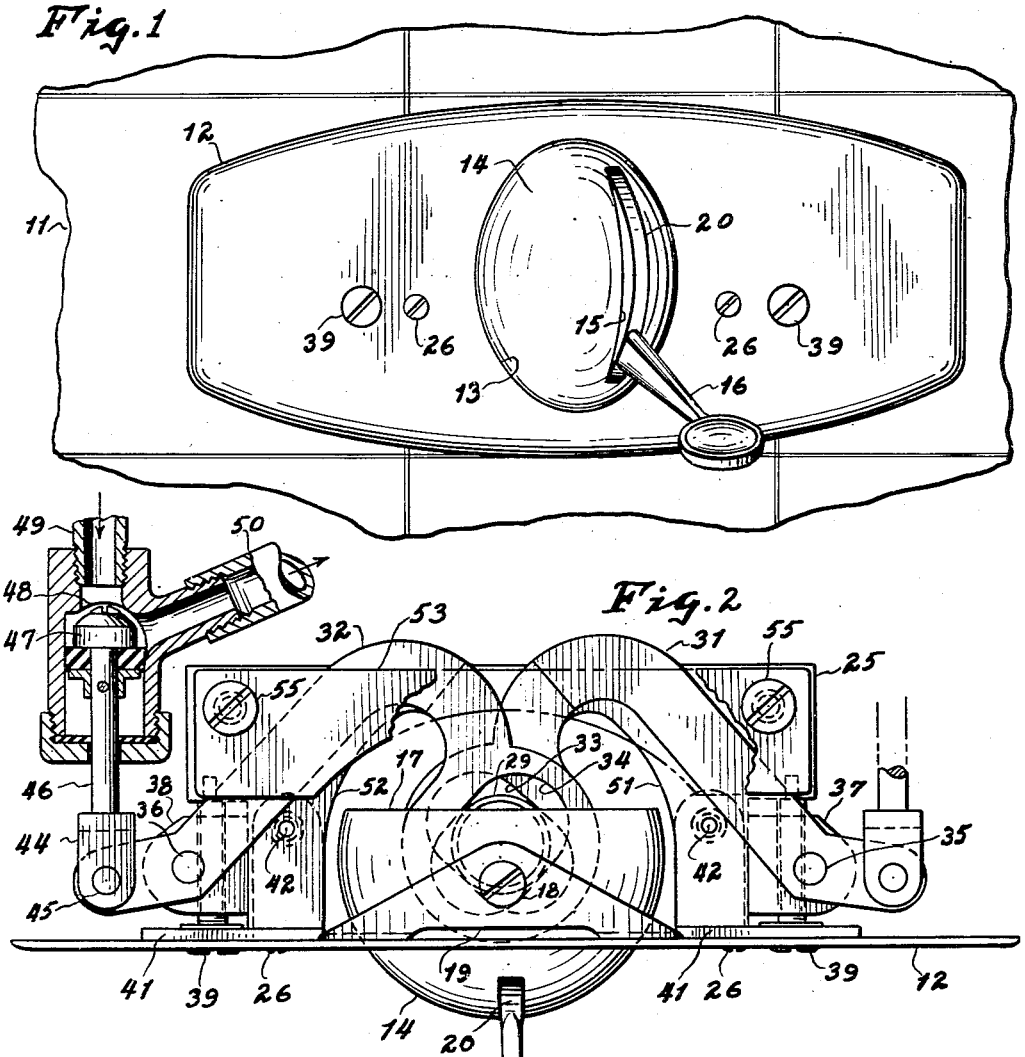
INVENTOR.
OTTO HARKE
BY
Emery, Varney, Whittemore & Dix
ATTORNEYS June 17, 1958 — O. HARKE — 2,839,085
MIXING VALVE
Filed Aug. 15, 1955 — 3 Sheets-Sheet 2

INVENTOR.
OTTO HARKE
BY Emery, Varney, Whittemore & Dix
ATTORNEYS

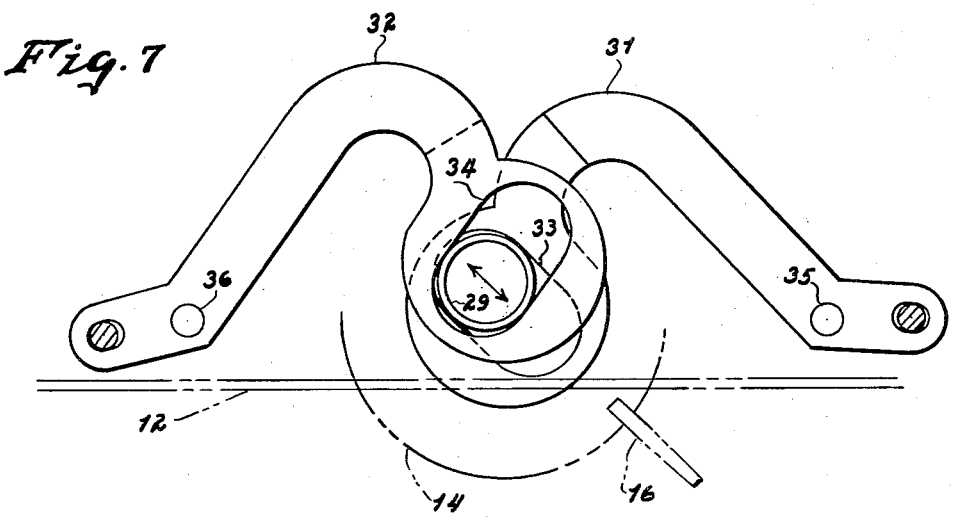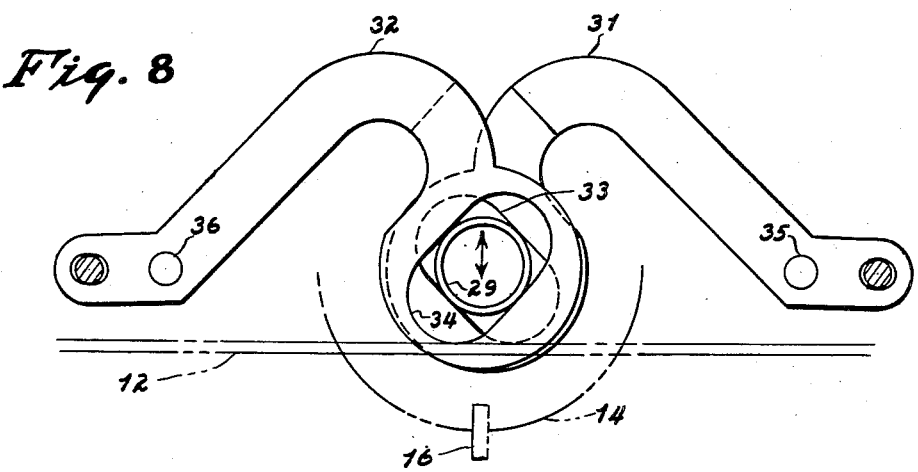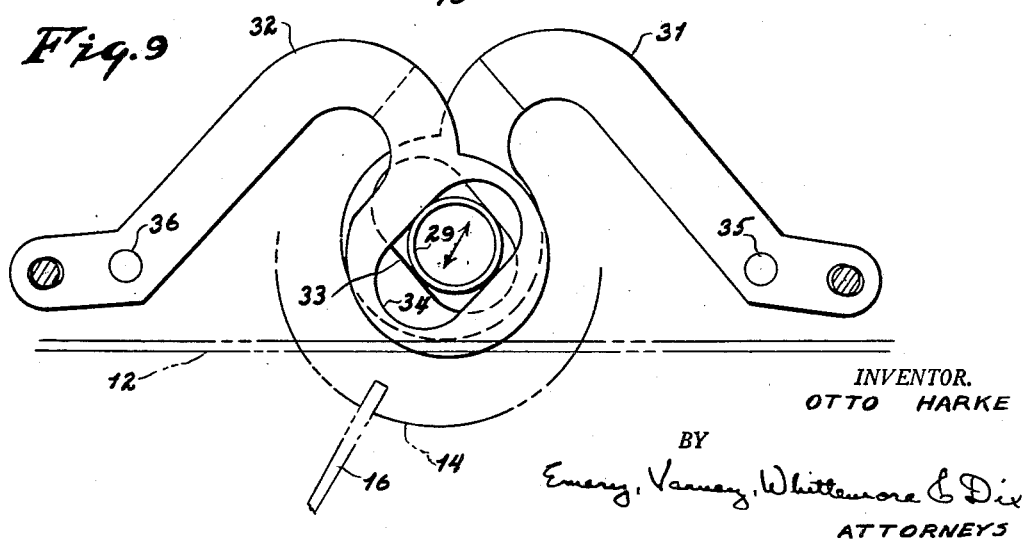

United States Patent Office 2,839,085
Patented June 17, 1958

2,839,085

MIXING VALVE

Otto Harke, Woodside, N. Y.

Application August 15, 1955, Serial No. 528,391

9 Claims. (Cl. 137—636.2)

This invention relates to fluid mixing valves and operating mechanisms therefor, and more particularly to valves which are adjustable to vary the flow of the mixed fluid, as well as to vary the proportions of the fluids, such adjustments being capable of being made simultaneously, or each independently without disturbing the other. Such a valve is disclosed in my Patent No. 2,679,864, June 1, 1954, and the present invention relates to improvements thereon.

It is an object of this invention to provide improved means for regulating the proportions of two fluids which are being mixed. It is a further object of the invention to provide improved means for regulating the flow volume of the mixture. It also is an object of this invention to provide means which may be easily adjusted to vary the proportions of the fluids being mixed, while maintaining the flow volume substantially uniform, and to vary the flow volume, while maintaining the proportions substantially unchanged. Still another object of this invention is to provide valve operating mechanism for a hot and cold water faucet which may be adjusted by one hand to vary the proportions of hot and cold water, as well as to vary the volume of the flow, such adjustments being made simultaneously, or consecutively and each independently of the other, at the will of the operator. Other objects and advantages of this invention will be pointed out or will appear hereinafter.

For purposes of illustration the invention will be described particularly with reference to mechanism for governing the opening and closing of two faucet valves such as are used in a shower bath, or a kitchen sink, or the like, for mixing hot and cold water to deliver a controlled volume of water at a desired temperature which may vary from full hot to full cold. In such mixing faucets it is desirable to be able to adjust the proportions of the hot and cold water to give the desired temperature of outflow without disturbing the volume of flow, and also to be able to vary the volume without disturbing the proportions of hot and cold water, and therefore the temperature of the delivered water. Otherwise, adjustment of one will necessitate readjustment of the other, with possible accompanying discomfort or even danger to the operator. Desirably these independent adjustments may be made either simultaneously, or independently, at the will of the operator.

A preferred embodiment of the invention selected for purposes of illustration is shown in the accompanying drawings. It will be evident from the following description that the present invention is not restricted to this illustrative example, but is to be limited only in accordance with the appended claims.

In the drawings:

Figure 1 is a front elevation of the exposed portion of the valve operating mechanism as it would appear installed, for example, in a bathroom wall;

Figure 2 is a top plan view, to enlarged scale as compared to Figure 1, of the valve operating mechanism, the control handle being adjusted to a different position from that shown in Figure 1;

Figure 3 is a fragmentary vertical section taken substantially on the line 3—3 of Figure 4, showing means for adjusting the pressure of a valve on its seat;

Figures 6 through 9 are top plan views of the valve operating levers showing the levers in different positions of adjustment.

Figure 4:
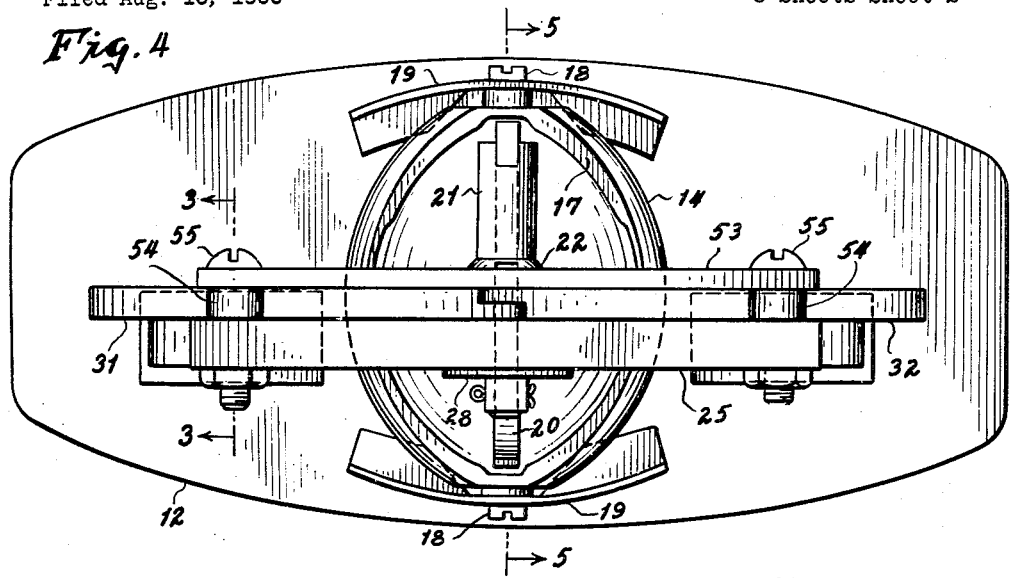
Figure 4 is a rear elevation of the valve operating mechanism.

Referring first to Figure 1 of the drawings in the illustrative embodiment the numeral 11 represents a wall in which the valve regulating mechanism is mounted. For example this might be the tiled wall in a bathroom where the valve operating mechanism is to control the volume and mixture of hot and cold water supplied to a shower. Projecting a short distance forwardly from a vertically disposed oval opening 13 in the cover plate 12 is an ovate shell 14. Projecting forwardly through a vertical slot 15 in the ovate shell is the outer edge of an arcuate member 20 having a handle 16 by which the volume and composition of the fluid mixture may be controlled at the will of the operator, as hereinafter described.

Figure 5:
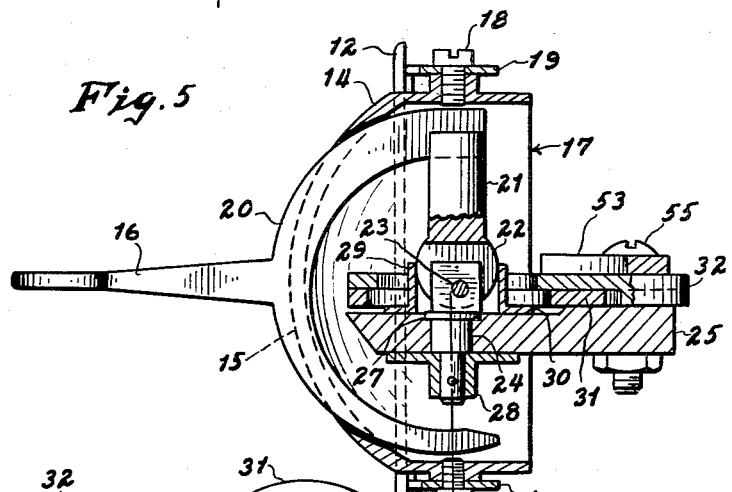
Figure 5 is a vertical section taken substantially on the line 5—5 of Figure 4.

As may be seen in Figures 2, 4 and 5, the ovate shell 14 is truncated in the back at 17. The ovate shell 14 is rotatably secured on its longitudinal axis relative to the cover plate 12 by means of screws 18 which extend through brackets 19 secured on the rear of the cover plate, as by brazing or welding, into axially disposed threaded openings in the ends of the shell.

The ovate shell 14 substantially fills the oval opening 13. When the handle 16 is adjusted horizontally it causes the ovate shell 14 to turn about its longitudinal, or vertical, axis, but even at the extreme limits of this turning range the truncated edge 17 remains concealed behind the cover plate 12. A function of the ovate shell 14 is to conceal the valve operating mechanism located in back of the cover plate at all times regardless of the position of horizontal adjustment of the handle 16.

The outer edge of the arcuate member 20, best seen in Figure 5, is made on a somewhat shorter radius than the ovate shell, so that the portion of the arcuate member projecting through the slot 15 closes the slot. This will be true for all vertical adjustments of the control handle 16, which is secured to, or made integral with, the pivotally mounted arcuate member 20.

One end of this arcuate member, the upper end as viewed in Figures 4 and 5, is rigidly secured to, or made integral with the radial arm 21, which, in the illustrative embodiment, terminates in a ball 22. This ball 22 is slotted vertically in the plane of the arcuate member 20 so as to provide a fork. The ball is pierced on the central axis of the curved outer surface of the arcuate member 20 to receive a pin 23 by which the ball is pivotally connected to the flat, radially offset upper end of the vertical shaft 24. Instead of a forked ball engaging a flattened end of the shaft, the radial arm might terminate in a disk engaging a slot in the upper end of the shaft.

As may best be seen in Figure 5, the shaft 24 is rotatably mounted in a horizontal base plate 25. The base plate 25 extends rearwardly from the cover plate 12 and is secured thereto, for example by means of screws 26 inserted from the front of the cover plate.

The shaft 24 desirably is provided with an annular flange 27 which is received in a matching opening in the upper surface of the base plate 25 and serves to limit downward movement of the shaft relative to the base plate. The shaft 24 is held against lifting relative to the base plate, for example by means of a flanged washer 28 secured on the stepped lower end of the shaft by known means, for example a coter pin.

From inspection of Figure 5 it will be seen that with the adjustment of the handle 16 as shown, i.e. substantially horizontal, the projected longitudinal axis of the shaft 24 does not intersect the longitudinal axis of the pin 23, but passes slightly to the left thereof. It will be noted that the longitudinal axis of the pin 23 is located slightly below the center of the ball 22. The dimensions of the parts are made such that when the handle 16 is at the lower limit of its range of vertical movement the center of the ball 22 will lie on the projected longitudinal axis of the shaft 24. For all other vertical adjustments of the handle 16 the center of the ball will be offset laterally from the longitudinal axis of the shaft 24, and the amount of this offset will be proportional to the distance which the handle 16 is moved upwardly from the lower limit of its range.

Slidably mounted on the upper surface of the base plate 25, encircling the shaft 24 and engaging the ball 22, is a cylindrical cam 29. At its lower end the cam 29 conveniently is provided with an external flange 30 and the surface of the base plate 25 surrounding the cam desirably is lowered by an amount equal to the thickness of the flange 30.

Overlapping rocker levers 31, 32 are provided, respectively, with cam slots 33, 34 which engage the cylindrical cam 29. The edges of the cam slots overlie the flange 30 to hold the cam against the base plate 25. The rocker levers, free to turn, will be held against the base plate, for example by means of a retaining plate 53 secured in spaced relation to the base plate by the spacers 54 and the screws 55. The spacers 54 may be made integral with the retaining plate 53 if desired. Movement of the cam 29 over the surface of the base plate will result in turning the rocker levers 31 and 32 about their pivotal axes, as will be described hereinafter.

Reverting to Figure 5, with the handle 16 in the adjustment shown, the center of the ball 22 is offset to the right of the projected longitudinal axis of the shaft 24. Consequently, when the handle 16 is adjusted in a horizontal direction the ball 22 will be moved in an arcuate path about the longitudinal axis of the shaft 24. The cylindrical cam 29 engages the ball 22 and will be moved correspondingly.

Vertical movement of the handle 16 will shift the center of the ball 22 in the plane of the arcuate member 20. As shown in Figure 5 the handle 16 is approximately at the midpoint of its vertical range of movement. If the handle 16 is raised from the position shown in Figure 5 there will be a further offsetting of the center of the ball 22 with respect to the projected longitudinal axis of the shaft 24 and this will produce a greater movement of the cam 29 when the handle 16 is adjusted horizontally.

On the other hand, if the handle 16 is depressed from the position shown in Figure 5, the center of the ball 22 will be brought nearer to the projected axis of the shaft 24 until at the lower limit of the range of movement of the handle 16 the center of the ball 22 will lie on the projected axis of the shaft 24. Adjustment of the handle 16 in a horizontal direction under these last described circumstances will merely result in the ball 22 turning on its axis and there will be no movement of the cylindrical cam 29, and consequently no movement of the rocker levers 31, 32.

In the illustrative embodiment the two rocker levers 31, 32 are alike, one merely being turned over end for end with respect to the other. The rocker levers, best shown in Figures 2 and 6–9, have a shape somewhat like that of a large interrogation mark. The cam slots 33, 34 are located in the tips of the curved ends, and for a distance beyond the cam slots this end of each rocker lever is only one-half the thickness of the rest of the lever. This permits the two levers to lie in a common plane and yet have their ends containing the cam slots overlap each other.

In the illustrative embodiment the rocker levers 31, 32 are of the same length, the angles of the cam slots 33, 34 in these levers are alike, and the cam slots cross each other when assembled with their ends overlapping in the manner described hereinabove. When the rocker levers are turned so that the longitudinal centers of the cam slots lie in the plane containing the pivotal axes of the two levers, the longitudinal axes of the cam slots will lie at angles of 45° with respect to the said plane. The cam slots then are at right angles to each other.

It will be understood that the angles of the cam slots under these circumstances need not necessarily be 45°, but that is an angle which may be expected under normally expected conditions of water pressures and water temperatures encountered in a dwelling to give satisfactory movement of the rocker levers accompanied by ease of control and a minimum of wear on the cam surfaces.

It is not essential that the angles of the cam slots in the two rocker levers be the same, although ordinarily that probably will be desirable where the fluid pressures of the hot and cold water supplies are approximately equal. For household use it ordinarily will be desirable for the water mixture to be lukewarm when the control handle is approximately at the midpoint of its horizontal range of movement. If the pressure of one fluid supply should be substantially different from the pressure of the other, or if the temperature of either supply should be unusual, then the angles of the two cam slots might be made different from each other in order to provide a lukewarm mixture of water at approximately the midpoint of the handle adjustment. Another way of accomplishing this result would be to make the rocker levers of different lengths.

The rocker levers 31, 32 are curved to provide clearance for the truncated edge 17 of the ovate shell 14 when the handle 16 is adjusted horizontally. As may be seen in Figure 2, the base plate 25 also is provided with curved recesses 51, 52 in which the edge of the ovate shell 14 may enter without interfering with horizontal adjustment of the handle 16.

Stop means are provided to restrict the turning range of the ovate shell 14 within the desired limits. Merely as an example, turning movement of the ovate shell may be stopped by engagement of the truncated edge 17 of the shell with the bottoms of the curved recesses 51, 52 in the base plate.

For residential use, and with cam slots at angles of 45° as described above, the ovate shell ordinarily will be permitted to turn through an angle of 90°. This will permit control of the water temperature from full hot all the way to full cold. However, in hotels and certain other buildings the temperature of the hot water may be so high as to present danger of scalding an unwary user and it may be desirable to prevent use of the hot water at the full temperature of the supply line. Provision of a stop, which may be made adjustable, to prevent angular adjustment of the ovate shell to the full hot water position will insure that some cold water always will be mixed with the hot water. This is a safety feature of the present valve.

In the illustrative embodiment, and ordinarily this will be so, the pivotal axes of the rocker levers 31, 32 are located toward their ends distant from the cam slots. The rocker levers 31, 32 are pivoted at 35, 36, respectively, the pivotal axes of the two levers lying in a common plane and being parallel. The rocker levers 31, 32 might be pivoted directly on the base plate 25, but desirably they will be pivoted to separate small adjustment plates 37, 38 which lie in the same plane as the base plate and are adjustable, within a limited range, forward and back relative to the cover plate 12.

Mechanism for effecting such adjustment may be similar for both adjustment plates and is illustrated and will now be described in more detail for one of the plates in Figure 3. The small adjustment plate 37 has a screw threaded opening from front to rear to receive an adjustment screw 39. The head end of the adjustment screw is flanged as shown at 40 for engagement by a bracket 41 secured to the base plate 25, as by means of a screw 42. The other end of the adjustment screw 39 is of reduced diameter as shown at 43 and pivotally engages a hole in the edge of the base plate 25.

The slotted heads of the adjustment screws 39 project through openings in the cover plate 12 so as to be capable of being adjusted without disassembling any part of the mechanism. Turning the adjustment screws 39 in one direction will move the small adjustment plates 37, 38 to the rear, and turning the adjustment screws in the opposite direction will move these small adjustment plates forward. Since the pivotal axes of the rocker levers are mounted on the small adjustment plates, this arrangement permits individual adjustment of each valve with respect to its valve seat. Thus, the valves may be readily adjusted initially to limit the pressure of each valve against its seat when the handle is at full closed position, and thereafter to accommodate for any wear.

The ends of the rocker levers 31, 32 remote from the cam slots 33, 34 are operatively connected to the valves, one valve controlling the flow of hot water and the other valve controlling the flow of cold water in the illustrative embodiment. Opening and closing of the valves is effected by short substantially rectilinear movement of the valves toward and away from their valve seats. Such movement of the valves is produced by turning the rocker levers 31, 32 about their pivotal axes.

Figure 2 of the drawings shows an illustrative valve and the second valve might be similar. The specific design of the valves may vary considerably without affecting the present invention.

As shown, the connection to the end of the rocker lever is made by a fork 44 connected to the end of the rocker lever by a pin or screw 45 passing through the prongs of the fork and through an opening through the rocker lever. Since the end of the rocker lever moves in an arc, the opening through the rocker lever preferably is in the form of a short slot on the longitudinal axis of the lever, so as to permit purely rectilinear movement of the valve stem without binding of the parts.

The valve stem 46 extending from the fork 44 is provided on its end with a valve 47 which engages the valve seat 48. When the valve is open, fluid flows from the supply pipe 49 through the valve and the branch pipe 50 to a Y, not shown, which also receives fluid from the other valve and combines the two flows into a single flow. It will be realized that with the pressures commonly employed in modern water supply systems a very small movement of the valve is sufficient to provide an entirely adequate flow of water through the branch pipe.

The operation of the mixing valve mechanism will now be described, reference being had particularly to Figures 5–9.

When the handle 16 is at the lower limit of its range of vertical movement the center of the ball 22 lies on the projected axis of the shaft 24. Under these conditions movement of the handle 16 to the right or to the left merely causes the ball 22 to turn within the cam 29 without producing any movement of the cam 29. Consequently there will be no movement of the rocker levers 31, 32. Both valves, that is the hot water valve and the cold water valve, are closed when the handle 16 is down.

The horizontal position of the handle 16 will determine whether hot water or cold water, or some intermediate mixture of the two, will be supplied when the handle is lifted. As long as the handle 16 is not lifted it may be adjusted horizontally without opening either water valve.

Figure 6:
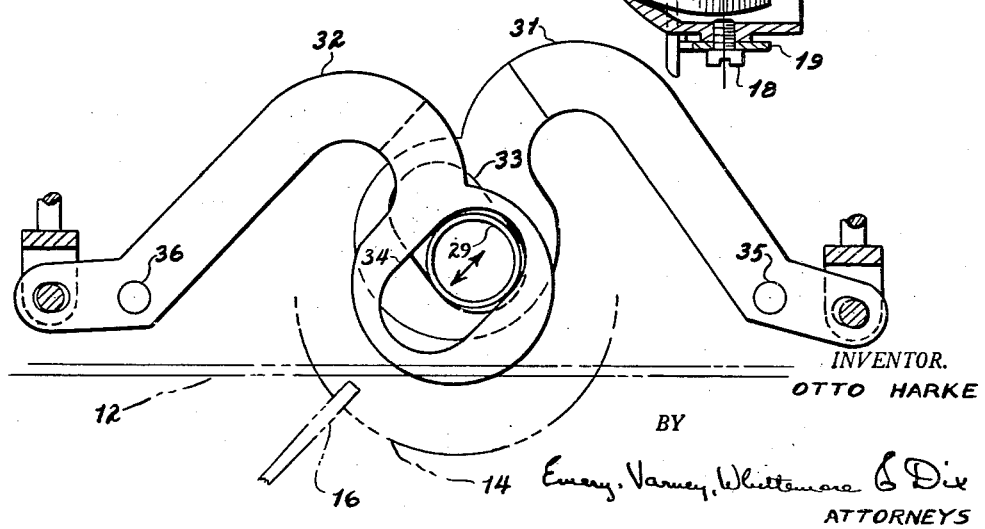

Movement of the handle 16 upwardly causes the center of the ball 22 to move away from the axis of the shaft 24, and produces corresponding movement of the cam 29. If the handle 16 is at the extreme left limit of its range of horizontal movement, as shown in Figure 6, vertical movement of the handle will cause the cam 29 to slide in the cam slot 34 of rocker lever 32, but this movement is along the longitudinal axis of the cam slot and consequently does not turn the rocker lever 32 about its pivotal axis 36. Vertical movement of the handle 16 under these conditions does, however, cause the cam 29 to turn the rocker lever 31 about its pivotal axis 35 to open the associated valve. As the handle 16 is lifted the volume of flow gradually increases and when the handle has been lifted to the upper limit of its range of movement this valve will be at its maximum opening. The other valve will remain closed.

If the handle 16 is at the extreme right limit of its range of horizontal movement, as shown in Figure 7, vertical movement of the handle 16 causes the cam 29 to slide in the cam slot 33 of rocker lever 31, but this movement is along the longitudinal axis of the cam slot and consequently does not turn the rocker lever 31 about its pivotal axis 35. Vertical movement of the handle 16 under these conditions does, however, cause the cam 29 to turn the rocker lever 32 about its pivotal axis 36 to open the associated valve. As the handle 16 is lifted the volume of flow through this valve gradually increases and when the handle has been lifted to the upper limit of its range of movement this valve will be at its maximum opening. The other valve will remain closed.

Thus it is seen that the cam 29, which operates the rocker levers 31, 32, is moved by vertical adjustment of the handle 16. Movement of the cam is along a line lying within the pair of vertical angles which are formed by the intersecting longitudinal axes of the cam slots 33, 34, and which contain the line passing through the point of intersection and perpendicular to the plane in which the pivotal axes of the rocker levers lie. The term "vertical angles" is used in the usual mathematical sense to mean two angles lying on the opposite sides of the two intersecting cam slot axes. The particular line along which the cam moves is determined selectively by horizontal adjustment of the handle 16.

From the foregoing it will be evident that hot water will be supplied when the handle 16 is at one limit of its horizontal range of movement and that cold water will be supplied when the handle is at the other limit of its range of movement, and that the volume of flow in both cases may be controlled simply by vertical movement of the handle.

If the handle 16 is midway in its range of horizontal movement, as shown in Figure 8, vertical movement of the handle causes the cam 29 to turn both rocker levers 31, 32 about their pivotal axes 35, 36. The rocker levers will be turned at an equal rate, but at a rate which is less than when either valve is being opened without opening the other valve. With the adjustment shown in Figure 8, and assuming pressures on the hot and cold water supply lines to be the same, equal proportions of hot and cold water will be supplied to the mixing pipe and the volume of flow may be controlled by vertical adjustment of the handle 16. Simple vertical adjustment of the handle 16 does not change the proportions of hot and cold water.

It will be evident that any desired mixture of hot and cold water may be obtained by horizontal adjustment of the handle 16. This horizontal adjustment of the handle may be made while both valves are closed, or while water is flowing in any volume.

If the handle 16 is at some horizontal adjustment intermediate one extreme limit of its range and the midpoint, for example as shown in Figure 9, vertical movement of the handle will cause the cam 29 to move the rocker levers 31, 32 unequal amoutns, the proportion depending on the horizontal adjustment of the handle. Thus, for any horizontal adjustment, i. e., for any temperature setting, of the handle the volume of flow of the mixed water may be controlled simply by vertical adjustment of the handle and there will be no change in the proportions of hot and cold water as long as the handle is not moved horizontally.

Moving the handle 16 horizontally changes the proportions of hot and cold water gradually from full hot to full cold without changing the volume of flow, while moving the handle vertically changes the volume of flow gradually from closed to full open without changing the proportions of hot and cold water. The handle 16 may be moved, selectively at the will of the operator, only horizontally, or only vertically, or simultaneously in the horizontal and vertical directions. In the closed position, that is with the handle down, the mechanism can be set to proper proportions for any desired water temperature before the valve is opened to start the flow. The temperature setting can be left unchanged and the water shut off and turned on whenever desired and in any desired volume.

I claim:

1. The combination with two valves of control mechanism for governing the opening and closing thereof to regulate the quantity and composition of a mixture of two fluids, the said control mechanism comprising individual rocker levers for actuating the valves, the pivotal axes of the rocker levers lying in a common plane and being parallel, one end of each rocker lever being operatively associated with its valve to open and close the valve and the other ends of the two rocker levers overlapping each other, the overlapping ends of the rocker levers being provided with cam slots which are angularly disposed with respect to the plane containing the pivotal axes of the rocker levers and which overlie each other in intersecting relation, a cylindrical cam passing through the said cam slots at their intersection, and means for selectively moving the cylindrical cam along any line lying within the pair of vertical angles which are formed by the intersecting longitudinal axes of the cam slots and which contain the line passing through the said intersection perpendicular to the aforesaid plane, to move the valve-actuating rocker levers independently, or simultaneously and equally, or simultaneously in varying proportions, depending on the angle of the line of movement of the cylindrical cam.

2. The combination according to claim 1, in which the two cam slots are at equal angles with respect to the said plane containing the pivotal axes of the two rocker levers.

3. The combination according to claim 2, in which the said angles are 45°.

4. The combination according to claim 1, in which the rocker levers are curved to shape generally resembling an interrogation mark and have the cam slots in the curved ends of the levers.

5. The combination according to claim 4, in which the longitudinal axis of the cam when located at the midpoint of the cam slot, the pivotal axis of the rocker lever, and the axis of connection of the rocker lever to the associated valve mechanism all lie in a common plane.

6. The combination according to claim 1, including means for individually adjusting the pivotal axes of the rocker levers relative to their associated valve mechanisms.

7. The combination with two valves of control mechanism for governing the opening and closing thereof to regulate the quantity and composition of a mixture of two fluids, the said control mechanism comprising individual rocker levers for actuating the valves, the pivotal axes of the rocker levers lying in a common plane and being parallel, one end of each rocker lever being operatively associated with its valve to open and close the valve and the other ends of the two rocker levers overlapping each other, the overlapping ends of the rocker levers being provided with cam slots which overlie each other in intersecting relation, a cam passing through the said cam slots at their intersection, means for selectively moving the cam in any direction in the plane of the overlapping rocker levers to move the rocker levers independently or simultaneously depending on the amount and direction of movement of the cam.

8. The combination with two valves of control mechanism for governing the opening and closing thereof to regulate the quantity and composition of a mixture of two fluids, the said control mechanism comprising individual rocker levers for actuating the valves, the pivotal axes of the rocker levers lying in a common plane and being parallel, one end of each rocker lever being operatively associated with its valve to open and close the valve and the other ends of the two rocker levers overlapping each other, the overlapping ends of the rocker levers being provided with cam slots which are angularly disposed with respect to the plane containing the pivotal axes of the rocker levers and which overlie each other in intersecting relation, a cylindrical cam passing through the said cam slots at their intersection, a shaft with which the cam is operatively associated, the shaft and the cam being coaxial in one adjustment, and means for selectively turning the shaft and for simultaneously, variably offsetting the longitudinal axis of the cam with respect to the longitudinal axis of the shaft to move the valve-actuating rocker levers independently or simultaneously depending on the angle of the line of movement of the cam.

9. The combination according to claim 8, in which the said means includes a cover plate behind which the mechanism is mounted, a truncated ovate shell substantially closing an oval opening in the cover plate and pivotally mounted to turn about its longitudinal axis in said opening, and an arcuate member projecting through a longitudinal slot in the said ovate shell and having a handle.

References Cited in the file of this patent

UNITED STATES PATENTS

| 970,974 | Torobrand | Sept. 20, 1920 |
| 1,822,082 | Davis | Sept. 8, 1931 |

OTHER REFERENCES

| 331,150 | Italy | of 1935 |